July 8, 1969 E. O. P. TATTER 3,454,961

TAPE CARTRIDGE HAVING A TAPE GUIDING GROOVE THEREIN

Filed Dec. 15, 1966 Sheet 1 of 3

Inventor
Ernest O. P. Tatter
By Hofgren, Wegner, Allen, Stellman & McCord Att'ys

TAPE CARTRIDGE HAVING A TAPE GUIDING GROOVE THEREIN

Filed Dec. 15, 1966

United States Patent Office
3,454,961
Patented July 8, 1969

3,454,961
TAPE CARTRIDGE HAVING A TAPE GUIDING GROOVE THEREIN

Ernest O. P. Tatter, Addison, Ill., assignor to Warwick Electronics Inc., a corporation of Delaware Filed Dec. 15, 1966, Ser. No. 601,917
Int. Cl. G11b *15/32*
U.S. Cl. 242—197 11 Claims

ABSTRACT OF THE DISCLOSURE

A cartridge for converting a conventional tape reel into a reel adapted for use in a tape recorder having means for automatically feeding tape from a tape supply station to a tape take up station. The cartridge includes a circumferentially continuous groove in the side wall thereof for guiding the leading end of the tape or tape leader to an outlet passage, and the outlet passage forms a portion of an opening having a further portion sized so as to allow a tape feed out means to move into the interior of the cartridge.

This invention relates to tape recording apparatus, and more particularly to tape recording apparatus including means for automatically threading and feeding tape from a tape supply station to a tape take-up station.

Heretofore, one of the most bothersome tasks that has confronted users of tape recording apparatus has been the necessity of manually threading tape from a tape supply reel, past a transducing station to a take-up reel, where the end of the tape is affixed to a tape holding means. Recognizing the undesirability of this operation, it has been recently proposed to provide tape recording apparatus with take-up reel structure that will automatically grip the end of the tape or a leader thereon, and guide channel means which will positively direct the tape from the supply reel, past the transducing station, and into the gripping means of the take-up reel. Such apparatus is disclosed and claimed in the copending application of Tatter et al., Ser. No. 406,239, filed Oct. 26, 1964, and assigned to the assignee of the present application. Although such apparatus represents a definite improvement in the state of the art, in the use of such apparatus, it is still necessary to manually position the end of the tape in the tape guide channel before it will automatically be fed therealong. Accordingly, one of the objects of the present invention is to provide tape recording apparatus with means which completely eliminates any manual hadling of the tape during the threading thereof from the supply reel to the take-up reel.

Another object of the invention is to provide cartridge structure for converting conventional tape reels into reels which will automatically feed tape therefrom without the necessity of any manual manipulation of the tape.

A related object of the invention is to provide cartridge structure as set forth in the preceding paragraph with novel guide means for insuring that the tape will be properly threaded along with the tape guide channel when it emerges from the cartridge structure.

A further object of the invention is to provide cartridge structure, as described above, for both conventional 5″ and 7″ reels.

These and other objects of the invention will hereinafter become more fully apparent from the following description, taken in connection with the annexed drawings, wherein.

Figure 1:
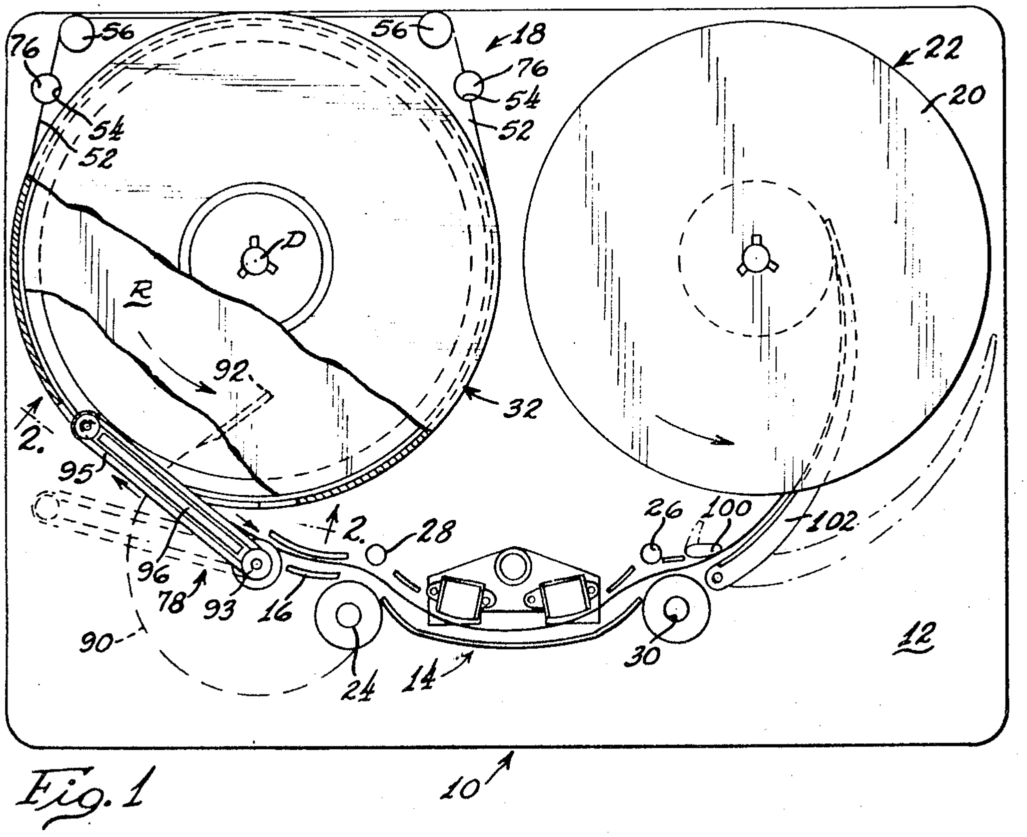
FIG. 1 is a plan view of a tape recorder with a first embodiment of the invention mounted thereon, and with certain parts broken away for clarity of illustration.
Figure 2:
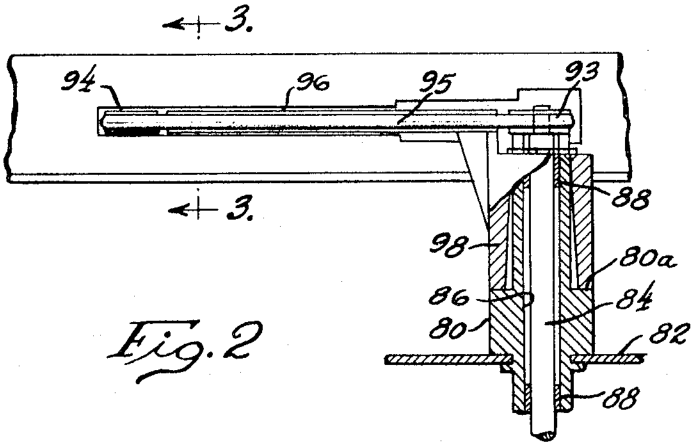
FIG. 2 is an enlarged sectional view taken generally along line 2—2 of FIG. 1.
Figure 3:
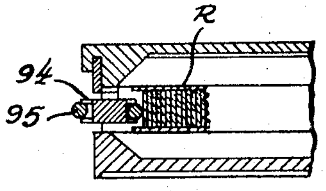
FIG. 3 is a sectional view taken generally along line 3—3 of FIG. 2.
Figures 4, 5:
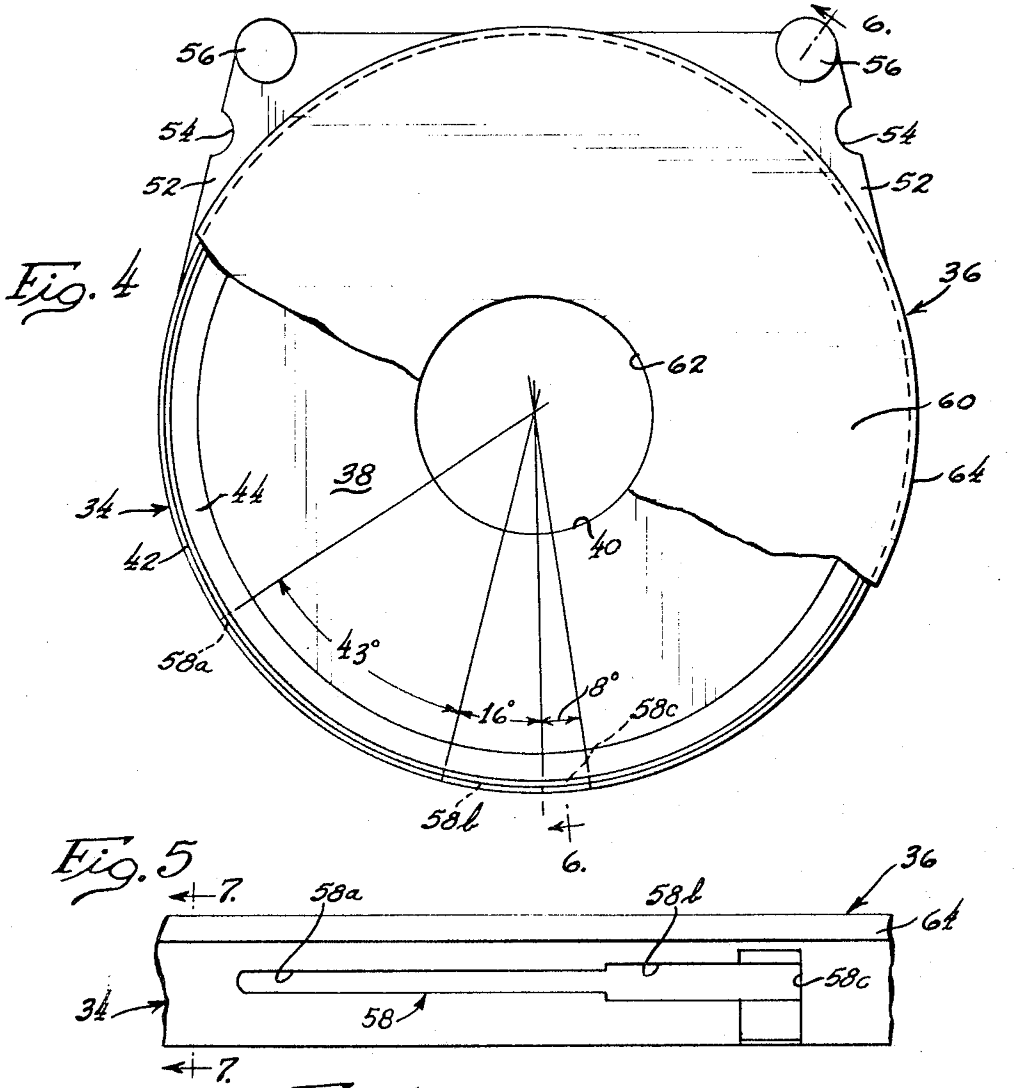
FIG. 4 is an enlarged plan view of the cartridge of FIGS. 1–3, with one flange thereof broken away for clarity of illustration.
FIG. 5 is a front elevational view of the cartridge of FIGS. 1–4 and illustrating the cartridge tape feed out slot.
Figure 6:
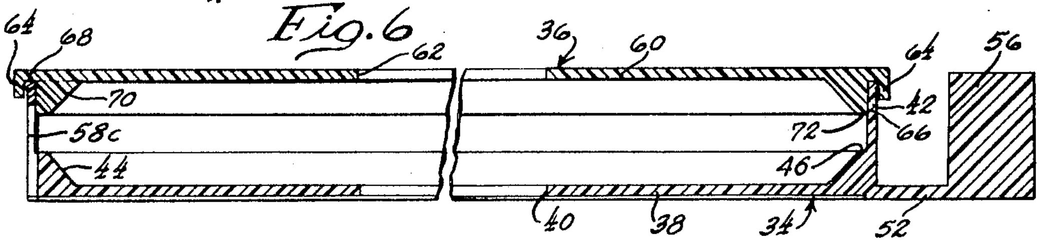
FIG. 6 is an enlarged sectional view taken generally along line 6—6 of FIG. 4.
Figure 7:
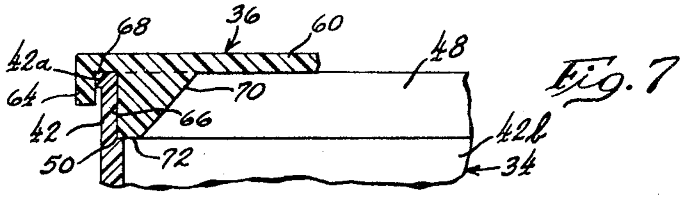
FIG. 7 is an enlarged fragmentary sectional view taken generally along line 7—7 of FIG. 5.
Figures 8, 9, 10, 11:
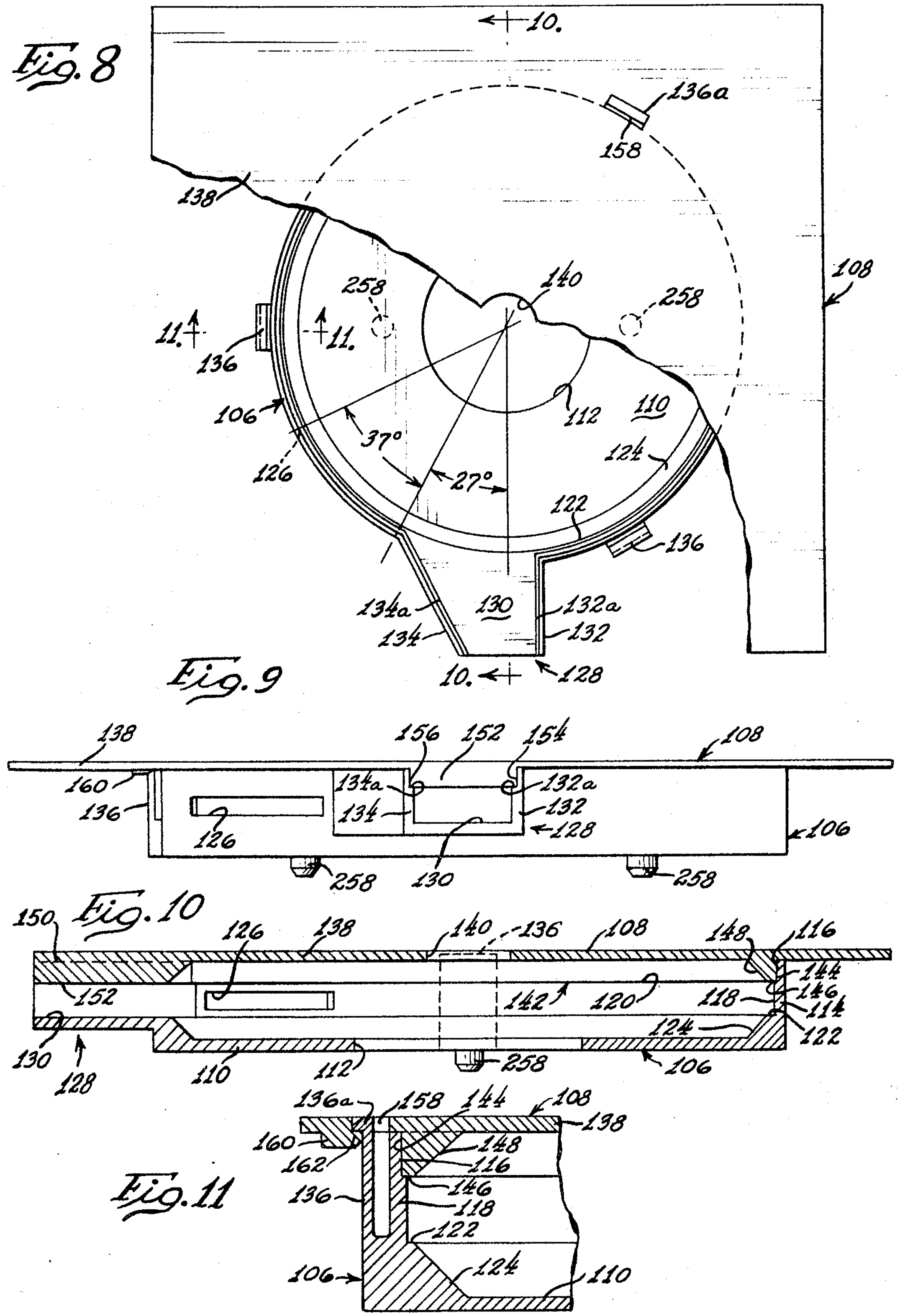
FIG. 8 is a plan view, similar to FIG. 4, and illustrating a second embodiment of the invention.
FIG. 9 is a front elevational view of the cartridge embodiment of FIG. 8.
FIG. 10 is a sectional view taken generally along line 10—10 of FIG. 8.
FIG. 11 is an enlarged sectional view taken generally along line 11—11 of FIG. 8.

While this invention is susceptible of embodiment in many different forms, there is shown in the drawings and will herein be described in detail an embodiment of the invention together with modifications thereof with the understanding that the present disclosure is to be considered as an exemplification of the principles of the invention and is not intended to limit the invention to the embodiments illustrated. The scope of the invention will be pointed out in the appended claims.

Referring now to the drawings, wherein like reference characters designate like or corresponding parts throughout the seveal views, a tape recorder is shown generally at 10 in FIG. 1 and includes a base plate 12 having a centrally located transducing station 14 adjacent the front edge thereof. Tape recorder 10 is preferably somewhat similar to that disclosed in the above mentioned Tatter et al. application Ser. No. 406,239, and reference may be made to the Tatter et al. application for details of the guide track construction and tape take-up and sensing means not specifically shown herein. As is explained in the above mentioned Tatter et al. application, channel means 16 is provided for guiding tape from a tape supply station 18 on the base 12, past the transducing station 14, to a take-up reel 20 at a take-up station 22 on the base 12. Movable left and right pressure rollers 24 and 26 cooperate with rotatable capstans 28 and 30 to feed the tape during normal tape recorder operation. During initial feeding of the tape, the pressure rollers 24 and 26 are spaced from the respective capstans 28 and 30, so that the tape may pass freely along the guide channel 16 from the supply station to the take-up station. In the structure disclosed in the above mentioned Tatter et al. application, the end of the tape from the supply reel must first be manually positioned in the guide channel, before automatic feeding along the tape path takes place. The present invention comprehends an improvement of the tape recorder disclosed in the Tatter et al. application, in that it discloses cartridge means whereby tape from an ordinary or conventional tape reel, when provided with a stiff yet resilient leader, can be automatically fed into the guide channel 16 without the necessity of any manual handling.

A first embodiment of the invention, illustrated generally at 32 in FIGS. 1–7, is usable with conventional 7″ tape reels. The cartridge 32 is formed of two pieces 34 and 36 releasably secured to one another. Piece 34 includes a generally circular planar base 38 having a central opening 40 thereon. A circumferentially continuous wall 42 extends around the periphery of base 38 generally perpendicular with respect thereto. The surface 44 joining wall 42 and base 38 is inclined at an angle of approximately 45° to define a first camming surface, and a second camming surface 46 extends outwardly from the end of surface 44 at an angle of approximately 20° with respect to the plane of base 38. The inner surface of the outermost portion 48 of wall 42 is stepped inwardly slightly to provide a circumferentially continuous shoulder 50 spaced from the end of inclined surface 46. Flanges 52 extend outwardly from opposite sides of one end of base 38, and outwardly facing arcuate notches 54 are provided therein. Generally cylindrical lugs 56 extend outwardly from flanges 52 perpendicularly to the plane thereof, and lugs 56 are positioned in a common plane with the outer peripheries thereof in alignment with one another to provide a support or stand for the cartridge 32 when it is not in use. A slot 58 is provided in cartridge side wall 42, and slot 58 includes a relatively narrow first portion **58*a* that is spaced from both shoulder 50 and the end of inclined surface 46, a second somewhat wider portion 58*b* that is substantially the same width as the distance between the end of inclined surface 46 and shoulder 50, and a still further enlarged third portion 58*c* that extends from the end of inclined surface 46 to slightly beyond shoulder 50. In an illustrative embodiment, the angular extent of slot portion 58*a* is approximately 43°, while the angular extent of slot portion 58*b* is approximately 16° and the angular extent of slot portion 58*c*** is approximately 8°.

The second cartridge piece 36 also includes a generally circular planar base 60, having a central hole 62 therein, and a circumferentially continuous wall 64 extends perpendicularly outwardly from base 60 at the outer periphery thereof. A further wall 66 extends perpendicularly outwardly from base 60 beyond wall 64, and the outer surface of wall 66 is spaced radially inwardly of the inner surface of wall 64 to define an annular groove 68 therebetween. A first inclined camming surface 70 extends outwardly from base 60 at an angle of approximately 45° with respect thereto, and a second inclined camming surface 72 extends outwardly from the end of surface 70 to the inner surface of wall 66, and surface 72 is disposed at an angle of approximately 20° with respect to the plane of base 60.

When the cartridge pieces 34 and 36 are assembled to one another, the wall 42 on cartridge piece 34 is fitted within the groove 68 in cartridge piece 36. Wall 42 includes an inclined locking surface **42*a* that is adapted to be forced against the inner surface of wall 64, to positively, yet releasably, secure the cartridge parts together. It will be understood, of course, that before the cartridge pieces are assembled to one another, the conventional 7″ tape reel R that is to be converted into an automatic feeding reel will be placed within one of the cartridge parts, and when the cartridge parts are assembled together, they collectively define an enclosure therebetween for retaining the reel R therewithin. When the cartridge parts are assembled together, the end of camming surface 72 on cartridge part 36 rests against the step 50 within cartridge part 34, and the inclined camming surfaces 46 and 72 and the wall portion 42*b* on cartridge part 34 between inclined portion 46 and outer wall portion 48 define a guide groove around the interior of the cartridge side wall. To utilize the cartridge of the present invention, a relatively stiff leader is affixed to the outer end of the magnetic tape in the reel R, and because of the resiliency of the leader, it is biased outwardly into the aforedescribed guide groove. Camming surfaces 44, 46, 70 and 72** cooperate to deflect the end of the tape leader to insure that it will ride within the guide groove.

When the reel R has been positioned in one of the cartridge pieces, and the two cartridge pieces have been assembled to one another, the cartridge 32 is then placed in position on the tape feed out station 18 of the tape recorder with the arcuate grooves 54 in the sides of the cartridge being engaged with the locating posts 76 on the tape recorder base 12 to positively hold the cartridge against rotation. When the cartridge 32 is positioned on the tape recorder 10, the slotted central opening in reel R is drivingly engaged with the conventional splined drive shaft D, and the slot portion **58*c* in cartridge 32 is positioned adjacent the entrance end of the tape guide channel 16. Feed out means 78 is also positioned adjacent the entrance end of the guide channel 16 for movement inwardly of the cartridge through slot portion 58*a***, to feed the tape leader on reel R around the guide groove and outwardly of the cartridge.

The illustrated embodiment of the feed out means 78 includes a bearing housing 80 fixed on a mounting plate 82 in the tape recorder 10 below base 12. An upright shaft 84 is rotatably mounted within a bore 86 in housing 80 by bearings 88, and a pulley 90 (FIG. 1) is fixed to the lower portion of shaft 84. An endless belt 92 (FIG. 1) is trained over pulley 90 for rotating shaft 84, it being understood that belt 92 is driven by motor means, not shown. A further pulley 93 is fixed to the upper end of shaft 84, and an endless belt 95 is trained over a still further pulley 94 that is carried by an arm 96 which is mounted for pivotal movement with respect to housing 80 by a sleeve 98. Sleeve 98 rests on a shoulder **80*a* of hub 80 to confine arm 96 for movement in the plane of slot 58. Means, not shown, but which may take the form of linkage means operable by a manually actuated knob or push button, is provided for moving arm 96 from the dotted line position shown in FIG. 1 outwardly of the cartridge 32 to the full line position shown in FIG. 1 wherein the arm 96 has pivoted and moved inwardly of the cartridge 32 through opening 58. In the full line position of FIG. 1, the inner reach of belt 95 bears against the leader on the outer end of the tape, and as the belt 95 moves in a clockwise direction, the tape leader moves in a counterclockwise direction around the cartridge 32 within the guide groove therein until it emerges from the enlarged slot portion 58*b*, it being understood that slot portion 58*a* is large enough to allow the arm 96 to move inwardly of the slot 58, but small enough to prevent the leader from moving outwardly therefrom until it reaches the enlarged portion 58*b*. Continued movement of the belt 95 will force the tape leader into the guide channel 16, through the space between pressure roller 24 and capstan 28, past the transducing station 14, through the space between pressure roller 26 and capstan 30, past a movable sensing finger 100, and into engagement with a guide finger 102, which guides the leader into the take-up reel 20, where tape gripping means, such as that disclosed in Tatter et al. application 406,239 positively grip the leader and constrain it for rotation with the take-up reel 20. As is explained in the above mentioned Tatter et al. application, when the tape is gripped, it becomes taut and pivots the sensing finger 100. Suitable means, not shown, may be made responsive to the pivotal movement of sensing finger 100 for pivoting arm 96 from the full line position of FIG. 1 to the broken line position of FIG. 1, so that the feeding of the tape by the feed out means 78** will be terminated.

Referring now to FIGS. 8–11, a second cartridge embodiment 104 is illustrated which is usable with conventional 5″ reels, and which is formed of two pieces 106 and 108 releasably secured to one another. Cartridge piece 106 includes a generally circular planar base 110 having a central opening 112 therein. A peripheral wall 114 extends perpendicularly outwardly from base 110, and the inner surface of wall 114 is stepped as shown at 116 and 118 to provide shoulders 120 and 122. An inclined camming surface 124 connects shoulder 122 and base 110, and surface 124 is positioned at an angle of approximately 45°. A slot 126 is provided in side wall 114 between shoulders 120 and 122, and the arcuate extent of slot 126 is approximately 37°. A channel or chute 128 projects outwardly from cartridge piece 106, and the upper surface 130 of channel 128 is positioned in the plane of shoulder 122. Channel 128 includes a first side wall 132 that is disposed generally perpendicularly with respect to cartridge piece side wall 114. Channel 128 further includes a second side wall 134 disposed at an angle with respect to cartridge piece side wall 114, and converging toward the channel side wall 132. Shoulders 132*a* and 134*a* on walls 132 and 134, respectively, are positioned in the plane of step 120, and effectively serve as continuations thereof. A plurality of locking fingers 136, three in the illustrated embodiment, are positioned radially outwardly of the side wall 114 of cartridge piece 106, and an outwardly extending portion 136*a* is provided at the upper end of each finger 136.

Cartridge piece 108 includes a generally rectangularly shaped base 138 having a central opening 140 therein. A circular rib 142 is positioned radially outwardly of opening 140, and includes: an outer surface 144 disposed generally perpendicularly with respect to base 138, a connecting surface 146 positioned in a plane generally parallel with base 138, and an inclined camming surface extending between connecting surface 146 and base 138. An extension 150 is provided at one side of rib 142, and includes a flat surface 152 disposed generally in the plane of surface 146. Extension 150 further includes a side surface 154 disposed generally at right angles with respect to rib 142, and a further side surface 156 is inclined with respect to rib 142 and converging toward side 154. A plurality of openings 158, one for each locking finger 136 and thus three in the illustrated embodiment, are provided on base 138 radially outwardly of rib 142. Projections 160 on base 138, adjacent each opening 158, include hook-like locking fingers 162 that overlie the respective openings 158 and snap into engagement with the locking lugs 136*a* at the upper ends of the locking fingers 136 of cartridge piece 106 to releasably, yet positively, secure the cartridge pieces 106 and 108 to one another. It will be understood, of course, that before the cartridge pieces 106 and 108 are assembled to one another, a 5″ conventional tape cartridge R′ is placed therebetween, and a stiff resilient leader is secured to the outer end of the tape.

A plurality of locating tabs 258 extend from the bottom of cartridge 104.

Thus, when the feed out means 78 is actuated to move arm 96 into the full line position of FIG. 1, the inner reach of belt 95 will engage the tape leader and drive it in a counterclockwise direction about the guide groove defined between surfacesa 122 and 146, with inclined camming surfaces 124 and 148 insuring that the end of the leader will follow the guide groove. As the end of the leader traverses around the guide groove, it will be fed outwardly of channel 128 into the entrance end of the guide track 16, from whence it will be fed to the take-up reel 22. It should be understood that if it is desired to place a 5″ reel in the 7″ cartridge 32, suitable adapter means will be provided within the cartridge enabling the feed out pulley to move inwardly of the cartridge while guiding the end of the tape leader toward the cartridge exit opening. Such an adapter would also include an annular groove for guiding the end of the tape leader.

I claim:

1. A cartridge for converting a conventional tape reel into a reel adapted for use in a self-threading tape recorder comprising: an annular side wall; spaced, generally parallel top and bottom walls at opposite ends of said side wall and cooperating therewith to form an enclosure for receiving a conventional tape reel therein; an opening in at least said bottom wall affording access to the interior of the cartridge, whereby the reel drive means of a tape recorder can be placed in engagement with the reel within the cartridge; means defining a circumferentially continuous groove in said side wall, said groove being adapted to receive the leading end of a relatively stiff tape leader therein to guide the same upon rotation of said conventional reel; and an opening in said cartridge side wall communicating with said groove, whereby said tape leader will pass outwardly of said cartridge upon rotation of said reel.

2. A cartridge as set forth in claim 1 wherein said cartridge is formed of two pieces releasably secured to one another whereby the reel within the cartridge enclosure can be readily inserted and removed.

3. A cartridge as set forth in claim 1 wherein inclined camming surfaces are provided on said side wall adjacent said groove for deflecting the end of the tape leader into the groove.

4. A cartridge as set forth in claim 1 wherein said cartridge opening has a first portion having a width less than the width of the tape leader, and a second portion having a width greater than the width of the tape leader.

5. A cartridge as set forth in claim 1 wherein said cartridge includes a channel extending outwardly from said side wall adjacent one end of said opening.

6. A cartridge as defined in claim 1 wherein means are provided forming a support upon which the cartridge may rest when not in use.

7. A tape recorder comprising: a frame; a tape supply station on said frame; reel drive means at said tape supply station; a tape take-up station on said frame; tape gripping means at said tape take-up station; a transducing station on said frame between said tape supply and tape take-up stations and cooperating therewith to define a tape path; means for guiding tape along said tape path from said tape supply station past said transducing station to said tape take-up station; rotatable capstan means for advancing tape along said path during normal tape recorder operation; a cartridge mounted on said frame at said tape supply station, said cartridge including an annular side wall, and spaced generally parallel top and bottom walls at opposite ends of said side wall and cooperating therewith to form an enclosure for receiving a conventional tape reel therein, an opening in at least said bottom wall allowing said reel drive means to drivingly engage said conventional reel, means defining a circumferentially continuous groove in said side wall, said groove being adapted to receive the leading end of a relatively stiff tape leader therein to guide the same upon rotation of said conventional reel, and an opening in said cartridge side wall communicating with said groove, said opening being positioned in alignment with the entrance end of said tape guiding means, whereby said tape leader will pass outwardly of said cartridge upon rotation of said reel and into said tape guiding means; and feed out means mounted on said frame for movement between a first position outwardly of said cartridge and a second position extending inwardly of said cartridge through said side wall opening into engagement with said leader to rotate said reel and automatically feed the leader into the tape guiding means.

8. A tape recorder as set forth in claim 7 wherein locating means are provided on said frame at said tape supply station, and said cartridge includes means engageable with said locating means for preventing rotation of said cartridge.

9. A tape recorder as set forth in claim 8 wherein said locating means is defined by a pair of spaced generally cylindrical posts, and said cartridge includes a pair of arcuate recesses, each engageable with a post.

10. A cartridge comprising: an annular side wall; spaced top and bottom walls at opposite ends of said side wall and cooperating therewith to define an enclosure for receiving a supply of tape; means defining a groove in said side wall, said groove being adapted to receive the leading end of a relatively stiff tape leader therein; and an opening in said cartridge side wall communicating with said groove, said opening having a portion with sufficient width to enable said tape leader and tape to pass outwardly of said cartridge.

11. A cartridge as set forth in claim 10 wherein said opening has a further portion with sufficient width to enable tape feed out means to move inwardly of said cartridge.

References Cited

UNITED STATES PATENTS

| | | | |
|---|---|---|---|
| 2,891,736 | 6/1959 | Blaes. | |
| 3,006,650 | 10/1961 | Ellmore. | |
| 3,190,575 | 6/1965 | Hayner et al. | 242—55.13 |
| 3,208,682 | 9/1965 | Pastor et al. | |
| 3,305,188 | 2/1967 | Sampson | 242—55.13 |
| 3,342,431 | 9/1967 | Mouissie | 242—55.13 |
| 3,346,210 | 10/1967 | Carstensen et al. | 242—71.1 |

GEORGE F. MAUTZ, *Primary Examiner.*